United States Patent
Smith et al.

(10) Patent No.: US 9,232,053 B2
(45) Date of Patent: Jan. 5, 2016

(54) EXTENDED HOT DESKING FEATURES FOR MULTI-DEVICE USERS

(75) Inventors: David Adam Smith, Ottawa (CA); Kenneth Armstrong, Woodlawn (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 470 days.

(21) Appl. No.: 12/798,991

(22) Filed: Apr. 15, 2010

(65) Prior Publication Data
US 2010/0267364 A1    Oct. 21, 2010

Related U.S. Application Data

(60) Provisional application No. 61/212,831, filed on Apr. 16, 2009.

(51) Int. Cl.
*H04M 3/00* (2006.01)
*H04M 3/42* (2006.01)

(52) U.S. Cl.
CPC ...... *H04M 3/42068* (2013.01); *H04M 3/42246* (2013.01); *H04M 3/42272* (2013.01); *H04M 3/42348* (2013.01)

(58) Field of Classification Search
CPC ....... H04L 67/306; H04L 67/34; G06F 21/41; H04M 3/42263; H04M 3/42272; H04Q 2213/1328
USPC ............... 455/432.3, 435.1, 432.1, 418, 419; 379/201.02–201.05, 201.12, 207.02, 379/207.13–207.15
See application file for complete search history.

(56) References Cited

U.S. PATENT DOCUMENTS

| | | | | |
|---|---|---|---|---|
| 5,657,377 | A * | 8/1997 | Pinard et al. | 379/93.02 |
| 6,011,975 | A | 1/2000 | Emery et al. | |
| 6,823,055 | B1 | 11/2004 | Mayer et al. | |
| 7,787,870 | B2 * | 8/2010 | Burgan et al. | 455/415 |
| 2003/0048880 | A1 * | 3/2003 | Horvath et al. | 379/88.01 |
| 2004/0243701 | A1 * | 12/2004 | Hardwicke et al. | 709/224 |
| 2005/0147226 | A1 * | 7/2005 | Anupam et al. | 379/201.02 |
| 2009/0016495 | A1 * | 1/2009 | Malas et al. | 379/37 |
| 2009/0082016 | A1 | 3/2009 | Bertagnole et al. | |
| 2011/0212705 | A1 * | 9/2011 | Sprigg et al. | 455/410 |

* cited by examiner

*Primary Examiner* — Kiet Doan
*Assistant Examiner* — Dung Lam

(57) ABSTRACT

The present application provides "hot desking" features for multi-device users. A number of automatic hot desking registrations are provided in which users are assigned multiple devices on a permanent basis. A private branch exchange or central switch can be provided with a list of these devices and can relieve the user of the requirement of registration by detecting use of these devices and assigning user features and other pertinent system properties e.g. as an indication of location for find me/follow me services. The extension allows for automatically hot desking using a listed device, hot desking based on a location associated with a listed device, and hot desking using declared associations of listed devices.

5 Claims, 4 Drawing Sheets

EXTENDED HOT DESKING FEATURES FOR MULTI-DEVICE USERS

REFERENCE TO RELATED APPLICATIONS

This application claims priority to U.S. Provisional Application Ser. No. 61/212,831 titled EXTENDED HOT DESKING FEATURE FOR MULTI-DEVICE USERS which was filed on Apr. 16, 2009 by David Smith and Kenneth Armstrong and is hereby incorporated in its entirety.

TECHNICAL FIELD

This application generally relates to communications, and more particularly, to extending hot desking features for multi-device users.

BACKGROUND

U.S. Pat. No. 5,657,377 ('377 Patent) titled PORTABLE TELEPHONE USER PROFILES, which is assigned to Mitel Networks Corporation, Canada, describes how a user can register for feature services on a central switch from devices located anywhere in the network including that switch. As taught, when a user signals the central switch from a device on that switch, or from a device on another switch, features can be assigned to them on calls to and from that device. This is commonly termed "hot desking" and allows features to be assigned to a user rather than a specific device. With this, users can roam from device to device and receive the features that they require.

Hot desking can provide a user with their enterprise features from devices that are connected anywhere in the public switched telephone network. This can provide a form of registration which allows the system to route incoming calls to a roaming user. It can also allow the user to declare the device at which they can be found and allow the system to supply the user with their preferred features at that device.

The '377 Patent was developed to provide services to a single device. Today, however, users are often associated with multiple devices. For example, a user can have a cell phone, a residence telephone, an office telephone, etc. The provision of multiple devices extends the scenario in which the '377 Patent can be used, which as disclosed within the present application can maintain multiple devices that are permanently associated with the user but can shift registrations for the central switch (PBX) features among them. A user can at one time wish to receive their PBX calls on their cell phone and at another time have them routed to their residence telephone. This can provide the opportunity for extending the functionality of the '377 technology to provide more benefits to the user.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

The description set forth below in connection with the appended drawings is intended as a description of presently-preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Overview

The present application relates to communications, and more particularly, to provide hot desking features for multi-device users. The application describes automating the process of hot desking, which, as disclosed in the '377 Patent, is a manual process. A number of automatic hot desking registrations are provided below in which users are assigned multiple devices on a permanent basis. A private branch exchange (PBX) or central switch can be provided with a list of these devices and can relieve the user of the requirement of registration by detecting use of these devices and assigning user features and other pertinent system properties e.g. as an indication of location for find me/follow me services.

As will be shown below, the automatic techniques disclosed include, but are not limited to, automatically hot desking using a listed device, hot desking based on a location associated with a listed device, and hot desking using declared associations of listed devices. While discussed individually, those skilled in the relevant art will appreciate that any combination of these automatic techniques can be provided in any single embodiment.

Central Switching System

Figure 1:
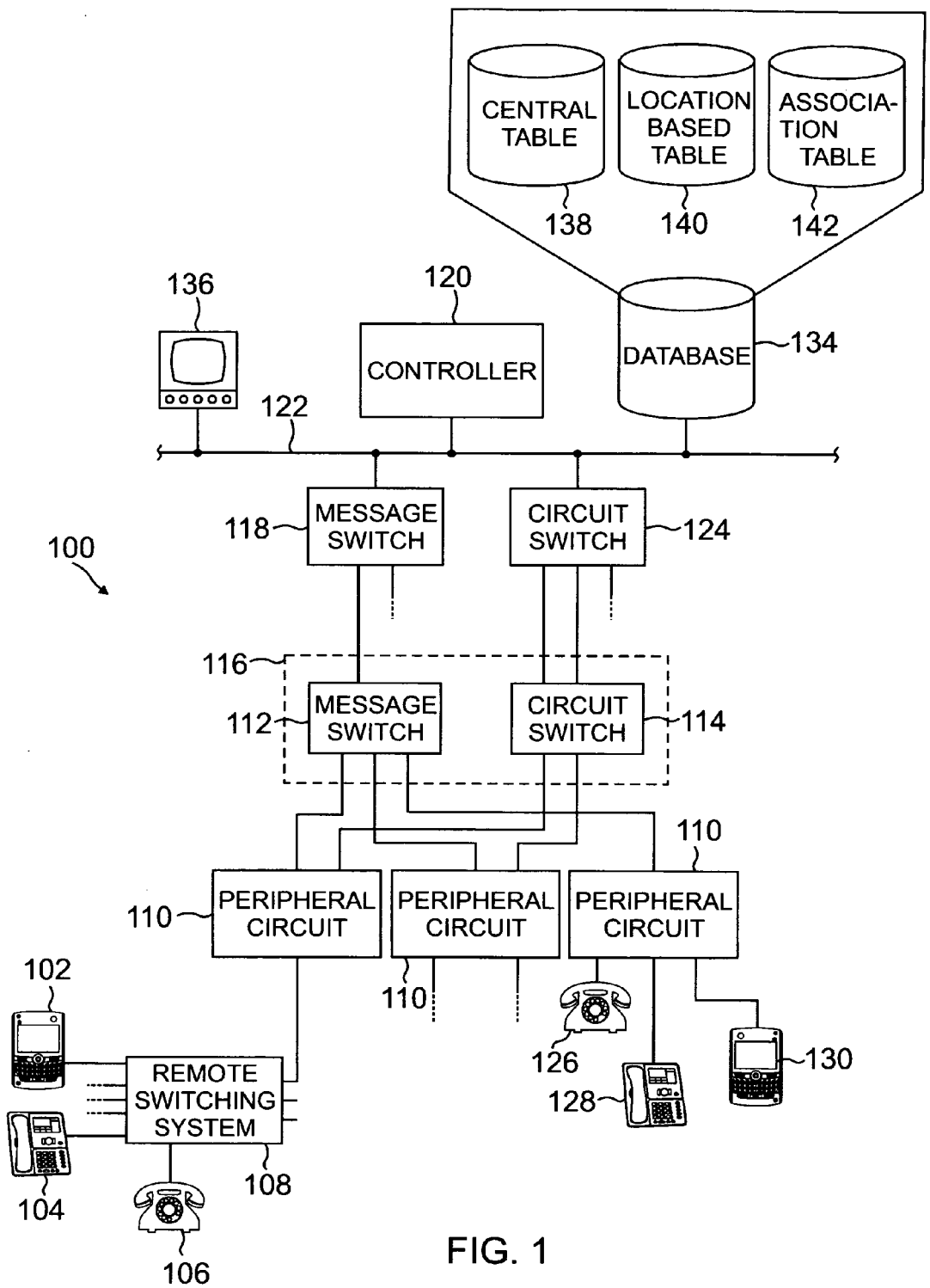
FIG. 1 is a block diagram representing an exemplary central switching system which can be used to implement a "hot desk" feature in accordance with one aspect of the present application.

The '377 Patent, which is hereby incorporated by reference in its entirety, discloses a system for invoking a user profile. The switching system is intended as one example for providing user profile information and should not be construed as limiting the scope of the present application. Modifications to the central switching system 100, depicted in FIG. 1, allow a user to automatically hot desk multiple devices. Generally described, and which will be provided in more details below, the modifications relate to hot desking using a listed device, hot desking based on a location associated with a listed device, and hot desking using declared associations of listed devices. The modifications will become apparent from the discussion provided below.

The central switching system 100 can include cell phones 102, office phones 104, and residential phones 106 connected to a remote switching system 108. The remote switching system 108 can be connected to a peripheral circuit 110 of a central switching system 100. Peripheral circuits 110 can be connected to message and circuit switches 112 and 114 respectively of a peripheral controller 116 of the central switching system 100. The peripheral controller 116 message switches 112 can be connected to a main system message switch 118 which can communicate with a central switching system controller 120 via a main system bus 122.

The peripheral controller circuit switches 114 can be connected to a main system circuit switch 124, which communicates with controller 120 via bus 122. Controller 120 can contain at least one processing unit, a memory containing operation programs, etc. The peripheral circuits 110 can contain line circuits, trunks, etc. e.g. which connect to local telephone sets 126, office phones 128, cell phones 130, etc.

A database 134 can be stored in a memory which is connected to bus 122. The database 134 can contain an activity map and have an entry associated with each physical device, which contains the state of the device and current user data. The current user data can include call record data for the call, and the user data associated with it. The call record data can include information about the current call and can be a dynamic data structure. The user data can be static, and can contain the data programmed in by the customer for a particular phone number, the user profile. What is programmed in by the customer for a particular telephone number can relate to their personal profile. The database 134, under control of controller 120, can be updated dynamically, thus assigning a user, with the user's profile including the user's telephone number.

As modified, the database 134 can also maintain a central table 138, a location-based table 140, and an association table 142. The central hot desking table 138 can be used to associate directory numbers of devices and the users who have been provided with the devices. The location-based hot desking table 140 can identify locations with the identity of an associated hot desking device, while the hot desking association table 142 can contain network addresses of devices that associate them with one or more devices that should be registered for hot desking with them. The database 134 can be updated with user profiles from a terminal 136 connected to bus 122 at the central switching system, or by a remote controlling means, or by updating the database 134 from data stored on a floppy disk or the like.

During the process of a call, the controller 120 can access the database 134, associating the user profile data with a device that is either remote or local to the system 100. The user profile data can contain at least a personal access code and directory number of the user. It can also contain at least one, and likely all of the data containing features and restrictions such as call forwarding, information, class of service, class of restriction, do not disturb settings, ring type, pick-up group number, interconnect number, call trace information, disconnect data, speed call information, network carrier numbers, etc. Each user having a particular telephone number has its own user profile characterized by the above.

While the central switching system 100 was described above, those skilled in the relevant art will appreciate that other systems and platforms can be used, such as a PBX. Furthermore, the components provided therein are for purposes of illustration and should not be construed as limiting to the present application.

Automatic Hot Desking

The '377 Patent disclosed a manual technique for registering a device for hot desking services. This involved the user dialing a directory number on the central switch 100 and providing a user identity code. The identity code, in one previous embodiment, was a user directory number. An optional security code could also be presented to verify the registration, which could have been in the form of a personal identification number. Using that information, the central switch 100 obtained the directory number of the device that was to be registered using an automatic number identification (ANI), caller ID, or other signaling information.

As shown, registration for hot desking with the '377 Patent disclosed a logon procedure. While this is not an onerous procedure, it can be an irritant for a user with multiple devices assigned for their exclusive use. If the user wishes to assign one of their devices for hot desking or transfer hot desking between a pair of them, they typically repeat the logon procedure for each device.

Figure 2:
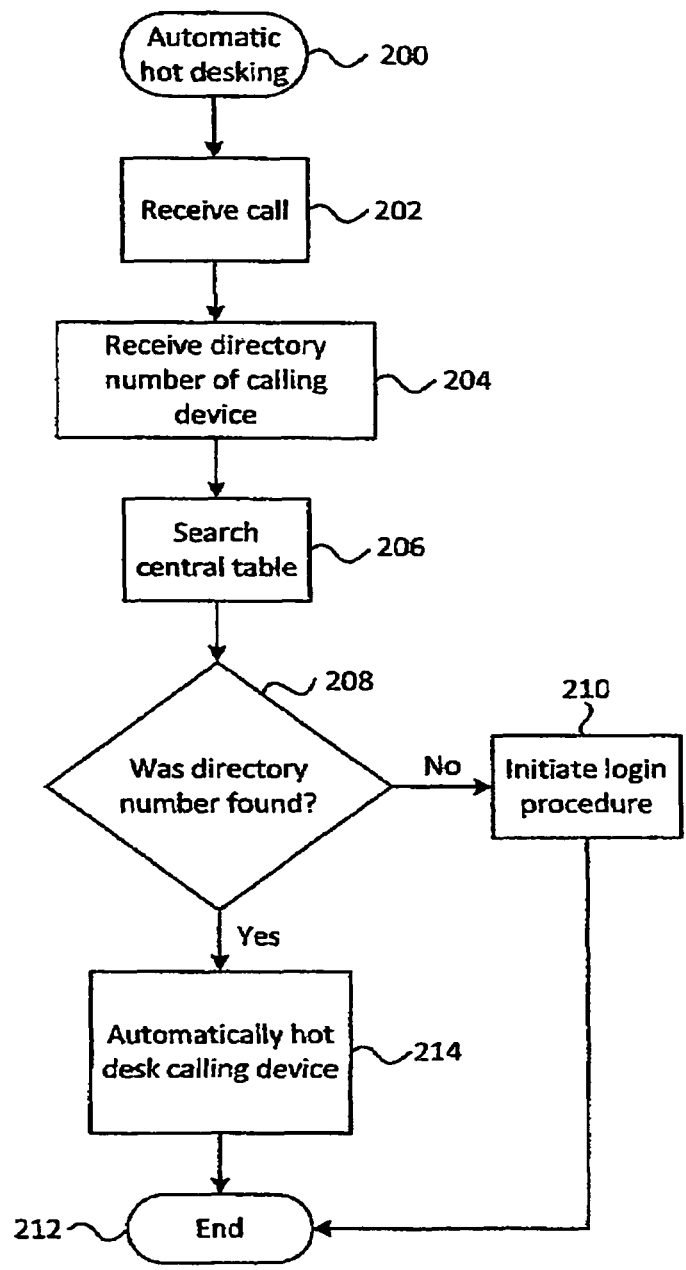
FIG. 2 illustrates a flow chart diagramming processes for automatically associating a calling device with a user's profile in accordance with one aspect of the present application.

To overcome multiple logons, and as an extension of the '377 Patent, FIG. 2 illustrates a flow chart diagramming processes for automatically associating a calling device with a user's profile in accordance with one aspect of the present application. The processes are provided from the perspective of the central switching system 100, but can be implemented from a variety of hardware and software platforms. Those skilled in the relevant art will appreciate that processes can be provided from the perspective of other components within the switch 100 or from the calling device itself. The processes can begin at block 200.

When a user calls the directory number on the central switch 100 that is assigned to hot desking services, the switch 100 can receive the call at block 202. Typically, the user calls from a passive entity through a distant switch. The distant switch can determine which lines go on and off. Tables on the distant switch can link the passive entity to a directory number. In one embodiment, the distant switch can operate using a trunking protocol, which is known to those skilled in the relevant art. At block 204, the switch 100 can receive the directory number of the calling device. Typically, the directory number is in the form of an ANI or caller ID information.

The central switch 100 can include a central table 138 that associates directory numbers of devices and the users who have been provided with them. At block 206, an automatic search of the central table 138 can be performed. At decision block 208, a determination is made whether a directory number was found within the central table 138. When the received directory number is not found, at block 210, a typical login procedure can be initiated, e.g. as described in the '377 Patent. In the alternative, when the received directory number is found, at block 214, an automatic hot desking registration on the external device can be performed for the associated user. The processes can end at block 212.

Location-Based Hot Desking

As disclosed below, and as an extension to the '377 Patent, another form of automatic registration for hot desking can be based on location sensing. Known to those skilled in the relevant art, location services are now becoming commonplace. Cellular companies provide services whereby the user can allow others to become aware of their location. Some cellphones can contain global positioning system (GPS) circuitry that allows a user to be located. Alternatively, the location of the base station to which a user's cellphone is connected provides a coarser idea of their location. Building location systems are also available.

To provide location-based hot desking, the database 134 can also include a location-based table 140. Each user, who is assigned a location-based hot desking service, can be provided with a table 140 in the central switch 100 that identifies locations with the identity of an associated hot desking device. A user can update their table 140 through a suitable management interface on terminal 136.

Figure 3:
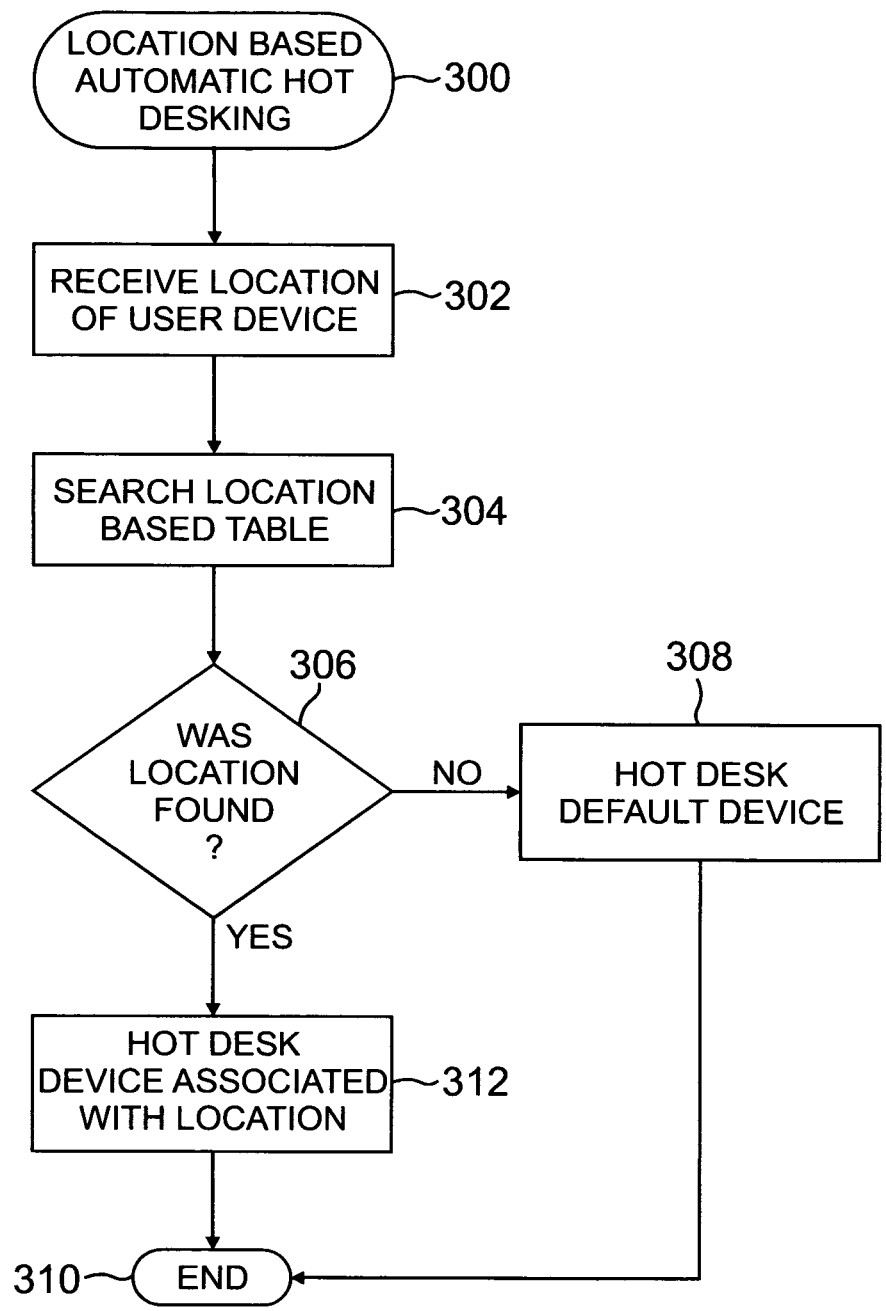
FIG. 3 depicts a flow chart showing exemplary processes for associating a calling device with a user's profile based on its location in accordance with one aspect of the present application.

FIG. 3 depicts a flow chart showing exemplary processes for associating a user device based on its location in accordance with one aspect of the present application. The processes can begin at block 300. At block 302, the central switching system 100 can receive a location of a user device. At block 304, a search of the location-based table 140 can be performed using the location of the user device.

At decision block 306, the system 100 determines whether the location of the user device was found within the location-based table 140. When the location of the calling device is not found, at block 308, the central switching system 100 can provide a user profile to a default device. A default location service can be provided that indicates the preferred hot desking device when none of the locations in the user's table 140 match their current location. In one embodiment, the user's cellphone can be registered for hot desking if the user is not at any of the locations specified within their table 140. In the alternative, when the location of the calling device is found, at block 312, the central switching system 100 can hot desk the device associated with that location as indicated within their table 140. The processes can end at block 310.

Associated Hot Desking

The '377 Patent describes the provision of a single hot desking number for use at any one time. For a multi-device user, however, certain devices are associated so that if the user indicates that they are at one device for hot desking, this can be taken as an indication that the user is available at another device as well. A common example of this is the association of a WiFi device and cellular telephone within the same apparatus. This device can have two network addresses, i.e. a directory number of the cellphone and a session initiation protocol uniform resource identifier (SIP URI) assigned to the WiFi telephone. If the user registers one of these devices for hot desking, then the other device can be registered for hot desking services as well. As a function of hot desking associated devices, incoming calls can be directed to both of these devices.

Figure 4:
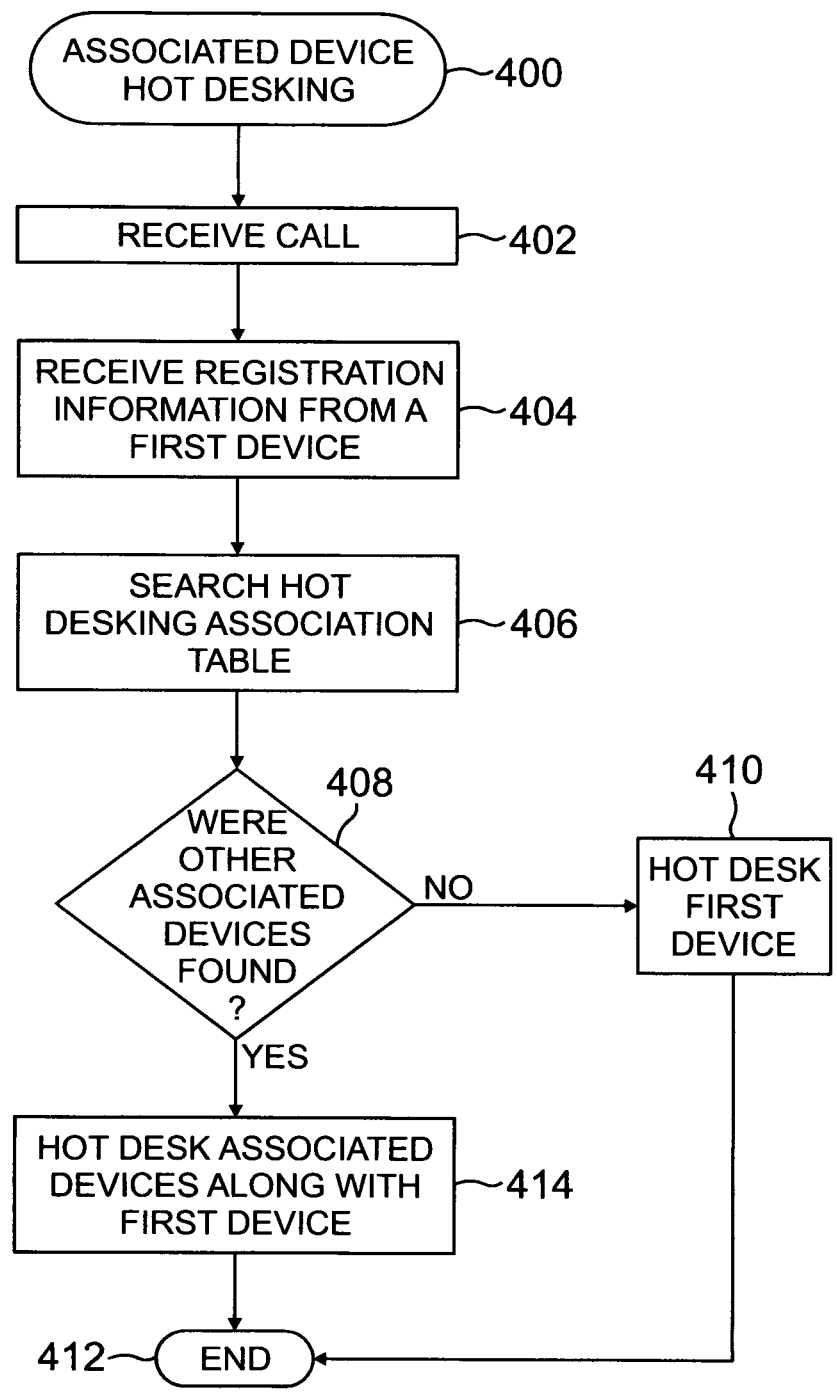
FIG. 4 provides an illustrative flow chart for "hot desking" a number of associated devices in accordance with one aspect of the present application.

FIG. 4 provides an illustrative flow chart for "hot desking" associated devices in accordance with one aspect of the present application. The processes can start at block 400. At block 402, the central switching system 100 can receive a call. The central switching system 100 can receive registration information from a first device at block 404. This information can include a directory number or some other identifying information.

At block 406, the system 100 can search the association table 142 using the information of the first device. Typically, for each user, there can be a table 142 of network addresses of devices that associates them with one or more associated deices that should be registered for hot desking with them. The network addresses can generally include a digit string or URI. At decision block 408, the central switch 100 can determine whether other associated devices were found within the association table 142. At block 410, and when no other devices were located, the central switch 100 can hot desk the first device. When other devices were found, at block 414, the central switch 100 hot desks devices associated with the first device along with the first device itself. The processes can end at block 412.

Systems, Methods, and Operations

In accordance with one aspect of the present application, a computer-implemented method for invoking an operational profile on a user device is provided. The method can include receiving a directory number from a distant switch. In addition, the method can include determining whether the directory number corresponds with an operational profile when the directory number is received from the distant switch. The method can also include providing the operational profile to the user device dependent on the determination.

In one embodiment, receiving the directory number from the user device can include receiving a call from the user device and extracting the directory number from the call. In one embodiment, determining whether the directory number corresponds with the operational profile can include searching a central hot desking table.

In one embodiment, the method can further include receiving a predetermined sequence identifying the user device when the directory number does not correspond with an operational profile. In addition, the method can include identifying an operational profile associated with the user device from the sequence. The method can also include providing the operational profile to the user device.

In one embodiment, the sequence can include a user directory number and a personal access code. In one embodiment, the operational profile can include at least one of call forwarding information, do not disturb settings, ring time, pickup group number, interconnect number, call trace information, disconnect data, speed call information, network carrier identification, presence information, personal ring group information, presence and availability preferences, personal policy preferences, class of services, class of restrictions, interconnected cores, corporate identity, and network identification carriers. In one embodiment, the user device can be at least one of a mobile phone, a residence phone, and an office telephone.

In accordance with another aspect of the present application, a system is provided. The system can include a database for storing a location associated with a communication device. In addition, the system can include at least one processor and a memory operatively coupled to the processor, the memory storing program instructions that when executed by the processor, causes the processor to perform processes. The processes can include receiving a position of a user device. In addition, the processes can include providing a user profile to the communication device when the position of the user device is at or proximate to the location of the communication device as indicated within the database.

In one embodiment, the position can be determined by a positioning system on the user device. In one embodiment, the position can be determined by a base station corresponding with the user device. In one embodiment, the position can be determined by a building locator corresponding with the user device. In one embodiment, the memory storing program instructions, that when executed by the processor, causes the processor to further update the database using a management interface. In one embodiment, the memory storing program instructions, that when executed by the processor, causes the processor to further provide the user profile to a default communication device when the position of the user device is not proximate to the location of the communication device as indicated within the database. In one embodiment, the default communication device can be a cellular phone.

In accordance with still yet another aspect of the present application, a central switch for providing user profiles is provided. The central switch can include a server that includes a database for storing network addresses for user devices and associations between the user devices. The server can include at least one processor and a memory operatively coupled to the processor, the memory storing program instructions that when executed by the processor, causes the processor to perform processes.

The processes can include receiving a network address from a user device. In addition, the processes can include determining whether the user device is associated with at least one other device by identifying associations within the database. The processes can also include providing a user profile to the network address of the user device and to a network address of the at least one other device dependent on the determination.

In one embodiment, the user device can be a WiFi device and the at least one other device can be a cellular telephone. In one embodiment, the network address of the cellular phone can be a directory number. In one embodiment, the network address of the WiFi device can be a SIP URI. In one embodiment, the user device and the at least one other device can be located on the same apparatus. In one embodiment, the processor can further route incoming calls to the user device and the at least one other device dependent on the determination.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method comprising:
   receiving a call from a switch;
   receiving a device telephone number of a calling device from which the call was placed;
   searching a hot desking table associating a plurality of device telephone numbers with an operational profile;
   in response to searching the hot desking table, determining whether said device telephone number corresponds with an operational profile;
   in the event the device telephone number of the calling device corresponds with an operational profile, then automatically invoking said operational profile on the calling device having the received device telephone number; and
   in the event the device telephone number does not correspond with an operational profile, then receiving a predetermined sequence identifying said calling device, identifying an operational profile associated with said calling device from said sequence, and
   invoking said operational profile to said calling device.

2. The method of claim 1, wherein receiving said device telephone number from said calling device comprises receiving a call from said device and extracting said device telephone number from said call.

3. The method of claim 1, wherein said sequence is comprised of a user directory number and a personal access code.

4. The method of claim 1, wherein said operational profile comprises at least one of call forwarding information, do not disturb settings, ring time, pickup group number, interconnect number, call trace information, disconnect data, speed call information, network carrier identification, presence information, personal ring group information, presence and availability preferences, personal policy preferences, class of services, class of restrictions, interconnected cores, corporate identity, and network identification carriers.

5. The method of claim 1, wherein said calling device is at least one of a mobile phone, a residence phone, and an office telephone.

* * * * *